Figure 1:
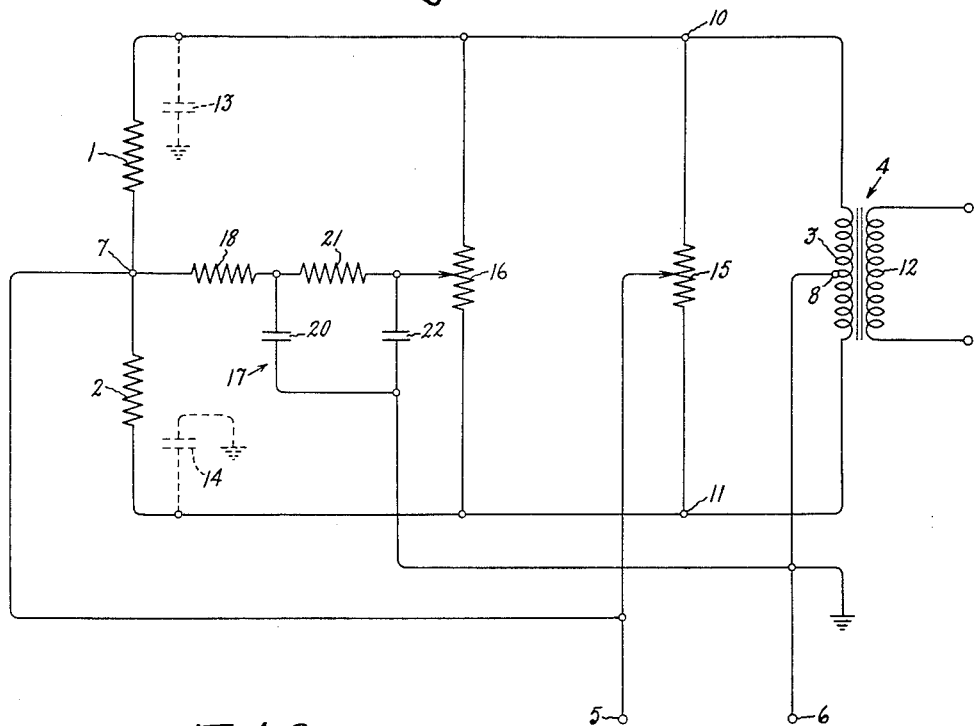

Aug. 7, 1956  H. L. CLARK ET AL  2,758,274
ELECTRICAL BRIDGE
Filed March 22, 1954

Inventors:
Howard L. Clark,
Raymond P. Washburn,
by Merton D. Moore
Their Attorney.

United States Patent Office 2,758,274
Patented Aug. 7, 1956

2,758,274

ELECTRICAL BRIDGE

Howard L. Clark, Ballston Lake, and Raymond P. Washburn, Schenectady, N. Y., assignors to General Electric Company, a corporation of New York Application March 22, 1954, Serial No. 417,746

11 Claims. (Cl. 323—75)

This invention relates to electrical bridge circuits and more particularly to a novel alternating current bridge circuit, which embodies means to correct initially and substantially independently for both resistance unbalances and reactance unbalances between the arms of the bridge.

In electrical bridge circuits of the type having four impedance arms, erroneous indications of unbalance may be caused by inherent differences in reactance that may be due to distributed reactive impedances in the various elements or the wiring of the bridge, and by inherent differences in resistances between the elements constituting the arms of the bridge. In order to adjust such a bridge circuit properly, it is necessary to provide means for initially balancing out inherent differences in resistance and any inherent differences in reactive impedance between the arms of the bridge, one of which may cause an amplitude unbalance in the current flowing in the arms of the bridge and the other of which may cause an ambient phase unbalance in the bridge. Various circuits have been proposed for accomplishing this end, but it has been found that in the majority of such circuits the resistance balancing adjustment and the reactance balancing adjustments interact with each other. This, of course, tends to make the initial balancing operation difficult and time consuming. Therefore, a primary object of the present invention is to provide a novel alternating current bridge circuit, which includes means for substantially independently balancing out inherent differences in reactance and inherent differences in resistance between the arms of the bridge.

Another object is to provide such a circuit which utilizes conventional, readily-available components, and which is inexpensive to construct.

An alternating current bridge circuit, by means of which the foregoing objects may be obtained, comprises four impedance arms, a pair of opposite bridge input points and a pair of opposite bridge output points between the impedance arms, and a pair of bridge input terminals across which an alternating voltage is impressed. Means are provided for impressing across the opposite input points a voltage in phase with the bridge input voltage. A pair of potentiometers are connected in parallel between the pair of output points, and the adjustable tap of one of the potentiometers is connected to one of the input terminals. The adjustable arm of the other potentiometer is connected to an input terminal through phase shifting means, which provides a voltage on the adjustable arm that differs in phase from the bridge input voltage by substantially 90°. Thus, a voltage is provided on the adjustable arm of one potentiometer, which is substantially in phase with the bridge input voltage, and adjustment of this potentiometer serves to correct any unbalance due to unequal resistances in the arms of the bridge. The voltage present on the adjustable arm of the other potentiometer is substantially 90° out of phase with the bridge input voltage, and provides a means for balancing out any distributed reactive impedances which might cause unbalance between the arms of the bridge. Hence, the two adjustments are substantially independent of each other.

Figure 2:
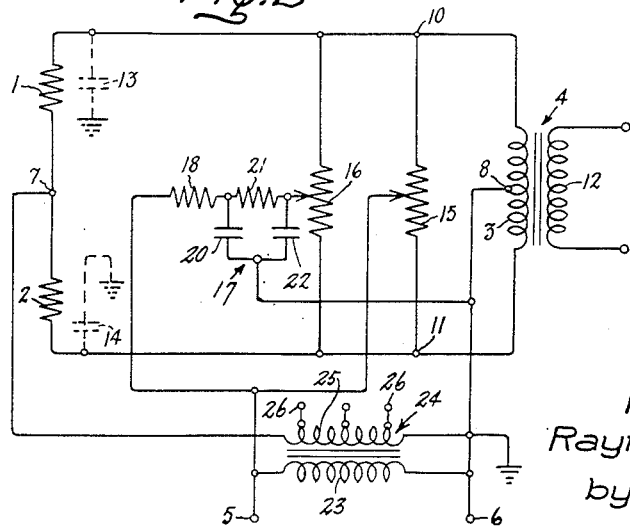

For a better understanding of the invention, reference is made to the following description, taken in conjunction with the accompanying drawing, in which Fig. 1 is a diagram of one form of the invention, and Fig. 2 is a diagram of a modified form of the invention.

Referring now to Fig. 1, it is seen that the novel bridge circuit of the invention comprises four impedance arms. Two of the four impedance arms may comprise variable resistance elements 1 and 2, such as conventional strain gages, whose resistances vary in accordance with the degree of strain under which they are placed. The other two arms of the bridge may comprise the two halves of a center-tapped primary winding 3 of a transformer 4. A conventional alternating current signal generator (not shown) may be connected to input terminals 5 and 6, which are connected to input point 7 between the resistance elements 1 and 2, and to the center tap 8 of the primary winding 3 of the transformer, respectively. If desired, the terminal 6 may be grounded. In operation, if the bridge is initially balanced with no force exerted on the strain gage elements 1 and 2, equal currents will flow through the two halves of the transformer primary winding 3, and no output signal will appear between output points 10 and 11 at opposite ends of the primary winding, or across secondary winding 12 of the transformer. If the bridge is thereafter unbalanced due to the application of a force to one or both of the strain gage elements, unequal currents will flow through the two halves of the primary winding, and an output signal will appear between points 10 and 11 and across the transformer secondary winding 12. Of course, the polarity and amplitude of the output signal will depend on the direction and extent of unbalance of the bridge. A conventional utilization circuit (not shown), which may include a meter or other indicating means, may be connected to the secondary winding 12. It is to be understood that the bridge circuit of the invention is not limited to the use of strain gage elements or a center-tapped transformer winding as arms of the bridge, and the circuit thus far described may be any conventional alternating current bridge circuit, such as is well-known in the art.

It has been found that in a bridge circuit of the type described above there may be distributed reactances, such as represented by capacitances 13 and 14, in the two halves of the bridge, which may be caused by distributed capacitances in the various elements or in the wiring of the bridge. Whatever their cause, the distributed capacitances 13 and 14 may well be of different size, and thus cause an ambient phase unbalance in the bridge. In addition, there may be an initial difference in resistance between the elements comprising the upper and lower branches of the bridge (as seen in the drawing) which may result in producing an amplitude unbalance in the current flowing in the different arms of the bridge. Therefore, it is necessary to provide independent means for balancing out the effect of the capacitances 13 and 14, and for balancing out initial differences in resistance between the resistance elements 1 and 2, between the two halves of the primary winding 3 of the transformer, or both.

In the preferred form of the invention, the means to balance out the initial differences in resistance between components comprises a potentiometer 15, connected between the points 10 and 11 across which the output signal appears. The adjustable arm of potentiometer 15 is connected to the ungrounded input terminal 5, which is also connected to bridge input point 7. Thus, the voltage appearing on the adjustable arm of potentiometer 15 is in phase with the input voltage, and, by adjusting the position of the movable arm of potentiometer 15, initial differences in resistance between the elements 1 and 2 or between the two halves of transformer primary winding 3 (or both) may be balanced out without affecting the phase balance, or unbalance, of the bridge.

As is well-known, the voltage appearing across a capacitor is substantially 90° out of phase with the current therethrough. Therefore, in order to balance out any phase differences due to the distributed capacitances 13 and 14, a voltage must be provided across the bridge which is substantially 90° out of phase with the bridge input voltage. To this end, there is provided another potentiometer 16, which is connected in parallel with potentiometer 15 across points 10 and 11. In order to provide a voltage on the movable arm of the potentiometer 16 that differs in phase from the bridge input voltage by substantially 90°, the movable arm of potentiometer 16 is connected to bridge input point 7 through a phase shifting network, designated generally by the numeral 17. In the particular embodiment of the invention illustrated, the phase shifting network includes two 45° phase shifting circuits, the first comprising a resistor 18 and a capacitor 20 which are connected in series between bridge input point 7 and center tap 8 of the transformer primary winding. The values of the resistor 18 and the capacitor 20 are so chosen that at the particular alternating current frequency employed, the voltage appearing across capacitor 20 is substantially 45° out of phase with the bridge input voltage. This voltage has its phase shifted an additional 45° by a network comprising a resistor 21 and a capacitor 22, which are connected in series across capacitor 20, and which have the proper values to affect the desired phase shift. Thus, the voltage appearing across capacitor 22 lags the bridge input voltage by substantially 90°. The juncture of resistor 21 and capacitor 22 is connected to the movable arm of potentiometer 16, so that currents flowing through potentiometer 16 are substantially 90° out of phase with the bridge input voltage. These currents, which are analogous to those caused by pure capacitances, may be used to balance out any difference in reactive impedance between the two halves of the bridge circuit, without affecting the resistance balance of the bridge. If the unbalanced reactance is inductive rather than capacitive, adjustment of potentiometer 16 will also balance out this effect.

Generally, the bridge is balanced with the resistive elements 1 and 2 in a quiescent state. The movable arm of potentiometer 15 is adjusted for resistance balance, which may be indicated by a minimum reading on an indicator in the utilization circuit (not shown) connected to the secondary winding 12 of the transformer. After the amplitude balance is obtained, the phase balance adjustment is made by varying the position of the movable arm on potentiometer 16 until a further minimum reading is obtained on the indicator. Because the amplitude balance adjustment and phase balance adjustment do not interact, only one adjustment of each potentiometer is normally necessary. Either may be made first, but because the effect of the amplitude balance adjustment is generally larger than the effect of the phase balance adjustment, the amplitude balance adjustment is usually made first.

Fig. 2 illustrates another bridge circuit constructed in accordance with our invention that is generally similar to that shown in Fig. 1. The principal difference is that the primary winding 23 of an input transformer 24 is connected across the bridge input terminals 5 and 6, and input point 7 and the center tap 8 of primary winding 3 of transformer 4 are connected to opposite ends of the secondary winding 25 of transformer 24. The center tap 8 of transformer primary winding 3, and corresponding ends of the primary and secondary windings of input transformer 24 are connected to input terminal 6 and may be grounded. The adjustable arm of potentiometer 15 is connected to input terminal 5, and the adjustable arm of potentiometer 16 is also connected to input terminal 5 through the phase shifting network 17. Thus, the voltage impressed on the arm of potentiometer 15 is in phase with the bridge input voltage, and adjustment of this potentiometer will effect the resistance balance of the bridge. The voltage on the arm of potentiometer 16 lags the bridge input voltage by substantially 90°, because of the action of the phase shifting network 17, and adjustment of this potentiometer will effect the reactance balance of the bridge. Therefore, it is apparent that the forms of the invention shown in Figs. 1 and 2 operate in substantially the same manner, so far as the resistance and reactance balancing operations are concerned.

The principal advantage of the circuit shown in Fig. 2 over that shown in Fig. 1 is that the voltage applied directly across the bridge between input point 7 and center-tap 8 may be chosen to be suitable for the particular bridge elements employed. In order to make the circuit even more adaptable for varied uses, intermediate taps 26 may be provided on the secondary winding 25 of input transformer 24. Thus, the voltage across the bridge may be changed without varying the input voltage connected to input terminals 5 and 6.

In the illustrated forms of the invention in which two of the impedance arms of the bridge comprise resistance strain gage elements, potentiometer 15 provides the amplitude balance adjustment (resistance balance) and potentiometer 16 provides the phase balance adjustment (reactance balance). However, if the resistance elements are replaced by reactance elements, such as capacitors or inductances, potentiometer 15 will provide the phase balance adjustment (resistance balance) and potentiometer 16 will provide the amplitude balance adjustment (reactance balance).

Of course, the values of the various circuit elements may differ from one circuit to another, and it is apparent that the values of some of the elements must be determined with regard to the frequency of the alternating current input signal. However, the following table lists typical circuit values for a bridge circuit constructed in accordance with the invention, when adapted to operate in conjunction with an alternating current input signal having a frequency of 5,000 cycles per second:

| | | |
|---|---|---|
| Potentiometer 15 | | 30K |
| Potentiometer 16 | | 30K |
| Resistor 18 | ohms | 390 |
| Capacitor 20 | mf | 0.1 |
| Resistor 21 | ohms | 3,300 |
| Capacitor 22 | mf | .01 |

It is now apparent that we have provided a novel alternating current bridge circuit, which includes means for adjusting the bridge for initial resistance unbalance and reactance unbalance independently of each other. The circuit utilizes conventional readily-obtainable components, and it may be constructed at low cost.

It is understood that although several embodiments of the invention have been described and illustrated, many further changes and variations may be made by one skilled in the art without departing from the spirit of the invention. For example, the strain gage elements 1 and 2 need not be resistances, and both need not be variable impedance elements. Various single elements of the circuit may be replaced by combinations of elements, and the output signal need not be obtained from a transformer. The transformer primary winding 3 might be replaced in the bridge by resistance elements, and the output signal taken from the points 10 and 11. Therefore, the invention is intended to be limited only by the scope of the appended claims.

What we claim as new and desire to secure by Letters Patent of the United States is:

1. In an alternating current bridge having four impedance arms, a pair of opposite bridge input points across which an alternating input voltage is impressed and a pair of opposite bridge output points across which an output is taken, a first potentiometer and a second potentiometer connected in parallel between said pair of output points, means for impressing on the adjustable arm of said first potentiometer a voltage in phase with the input voltage, a resistance-capacitance phase shifting network connected to provide across a portion thereof a voltage which differs in phase from the input voltage by substantially 90°, and means for impressing said phase-shifted voltage on the adjustable arm of said second potentiometer.

2. In an alternating current bridge having a pair of input points and a pair of output points, a pair of impedance arms connected in series between said output points with one said input point between them, a second pair of impedance arms connected in series between said output points with the other said input point between them, the first and second pairs of impedance arms being connected in parallel relationship, a pair of bridge input terminals across which an alternating input voltage is impressed, means for impressing across said input points a voltage in phase with the bridge input voltage, a pair of potentiometers connected in parallel between said output points, the adjustable arm of one of said potentiometers being connected to one of said input terminals, a resistance-capacitance phase shifting network connected between said input terminals for providing across a portion of said network a voltage which differs in phase from the input voltage by substantially 90°, and means for impressing said phase-shifted voltage on the adjustable arm of the other of said potentiometers.

3. In an alternating current bridge having a pair of input points and a pair of output points, a pair of impedance arms connected in series between said output points with one said input point between them, a second pair of impedance arms connected in series between said output points with the other said input point between them, the first and second pairs of impedance arms being connected in parallel relationship, a pair of bridge input terminals across which an alternating input voltage is impressed, means for impressing across said input points a voltage in phase with the bridge input voltage, a pair of potentiometers connected in parallel between said output points, the adjustable arm of one of said potentiometers being connected to one of said input terminals, a first resistor and a first capacitor connected in series between said bridge input terminals, a second resistor and a second capacitor connected in series across said first capacitor for providing across said second capacitor a voltage which lags the bridge input voltage by substantially 90°, and means for impressing the voltage appearing across said second capacitor on the adjustable arm of the other of said potentiometers.

4. In an alternating current bridge having a pair of input points and a pair of output points, a pair of resistance arms connected in series between said output points with one said input point between them, a pair of impedance arms connected in series between said output points with the other said input point between them, said series-connected resistance arms and said series-connected impedance arms being in parallel relationship, a pair of bridge input terminals across which an alternating input voltage is impressed, means for impressing across said input points a voltage in phase with the input voltage, a pair of potentiometers connected in parallel between said output points, the adjustable arm of one of said potentiometers being connected to one of said bridge input terminals, a first resistor and a first capacitor connected in series between said bridge input terminals, a second resistor and a second capacitor connected in series across said first capacitor for providing across said second capacitor a voltage which lags the bridge input voltage by substantially 90°, and means for impressing the voltage appearing across said second capacitor on the adjustable arm of the other of said potentiometers.

5. In an alternating current bridge having four impedance arms, a pair of opposite bridge input points across which an alternating input voltage is impressed and a pair of opposite bridge output points across which an output is taken, a pair of potentiometers connected in parallel between said pair of output points, the adjustable arm of one said potentiometer being connected directly to one of said pair of input points, a resistance-capacitance phase shifting network connected between said pair of input points for providing across a portion of said network a voltage which differs in phase from the bridge input voltage by substantially 90°, and means for impressing said phase-shifted voltage on the adjustable arm of the other said potentiometer.

6. In an alternating current bridge having four impedance arms, a pair of opposite bridge input points across which an alternating input voltage is impressed and a pair of opposite bridge output points across which an output is taken, a pair of potentiometers connected in parallel between said pair of output points, the adjustable arm of one said potentiometer being connected to one of said pair of input points, a resistance-capacitance phase shifting network connected between said pair of input points for providing across a portion of said network a voltage which lags the bridge input voltage by substantially 90°, and means for impressing said lagging voltage on the adjustable arm of said second potentiometer.

7. In an alternating current bridge, a pair of opposite bridge input points across which an alternating voltage is impressed and a pair of opposite bridge output points across which an output voltage is taken, a pair of resistance arms connected in series between said pair of output points with a input point between them, a pair of impedance arms connected in series between said pair of output points with the other input point between them, said series-connected resistance arms and said series-connected impedance arms being in parallel relationship, a pair of potentiometers connected in parallel between said pair of output points, the adjustable arm of one said potentiometer being connected directly to one of said pair of input points, a first resistor and a first capacitor connected in series between said pair of input points, a second resistor and a second capacitor connected in series across said first capacitor for providing across said second capacitor a voltage which lags the bridge input voltage by substantially 90°, and means for impressing the voltage appearing across said second capacitor on the adjustable arm of the other of said potentiometers.

8. In an alternating current bridge having four impedance arms, a pair of opposite bridge input points and a pair of opposite bridge output points, a pair of input terminals across which an alternating input voltage is impressed, a transformer having a primary winding and a secondary winding with the primary winding connected across said input terminals, means connecting said secondary winding across said pair of bridge input points, a pair of potentiometers connected in parallel between said output points, the adjustable arm of one said potentiometer being connected to one of said input terminals, and phase shifting means connecting the adjustable arm of the other of said potentiometers to one of said input terminals.

9. In an alternating current bridge having a pair of input points and a pair of output points, a pair of impedance arms connected in series between said output points with one said input point between them, a second pair of impedance arms connected in series between said output points with the other said input point between them, the first and second pairs of impedance arms being connected in parallel relationship, a pair of bridge input terminals across which an alternating input voltage is impressed, a transformer having a primary and a secondary winding with the primary winding connected across said bridge input terminals, means connecting said secondary winding across input points, a pair of potentiometers connected in parallel between said output points, the adjustable arm of one said potentiometer being connected to one of said input terminals, a resistance-capacitance phase shifting network connected between said input terminals for providing across a portion of said network a voltage which differs in phase from the input voltage by substantially 90°, and means for impressing said phase-shifted voltage on the adjustable arm of the other of said potentiometers.

10. In an alternating current bridge having a pair of input points and a pair of output points, a pair of impedance arms connected in series between said output points with one said input point between them, a second pair of impedance arms connected in series between said output points with the other said input point between them, the first and second pairs of impedance arms being connected in parallel relationship, a pair of bridge input terminals across which an alternating input voltage is impressed, a transformer having a primary and a secondary winding with the primary winding connected across said bridge input terminals, means connecting said secondary winding across said input points, a pair of potentiometers connected in parallel between said output points, the adjustable arm of one said potentiometer being connected to one of said input terminals, a first resistor and a first capacitor connected in series between said bridge input terminals, a second resistor and a second capacitor connected in series across said first capacitor for providing across said second capacitor a voltage which lags the bridge input voltage by substantially 90°, and means for impressing the voltage appearing across said second capacitor on the adjustable arm of the other of said potentiometers.

11. In an alternating current bridge having a pair of input points and a pair of output points, a pair of resistance arms connected in series between said output points with one said input point between them, a pair of impedance arms connected in series between said output points with the other said input point between them, said series-connected resistance arms and said series-connected impedance arms being in parallel relationship, a pair of bridge input terminals across which an alternating input voltage is impressed, a transformer having a primary and a secondary winding with the primary winding connected across said bridge input terminals, means connecting said secondary winding across said input points, a pair of potentiometers connected in parallel between said output points, the adjustable arm of one of said potentiometers being connected to one of said bridge input terminals, a first resistor and a first capacitor connected in series between said bridge input terminals, a second resistor and a second capacitor connected in series across said first capacitor for providing across said second capacitor a voltage which lags the bridge input voltage by substantially 90°, and means for impressing the voltage appearing across said second capacitor on the adjustable arm of the other of said potentiometers.

References Cited in the file of this patent
UNITED STATES PATENTS
2,457,165   McNamee _____ Dec. 28, 1948